(No Model.)  2 Sheets—Sheet 1.

J. N. SKINNER.
LATHE CHUCK.

No. 250,400.  Patented Dec. 6, 1881.

Witnesses.  Inventor.

(No Model.) 2 Sheets—Sheet 2.

J. N. SKINNER.
LATHE CHUCK.

No. 250,400. Patented Dec. 6, 1881.

Witnesses.
C. L. Burdett.
Edwin F. Dimock.

Inventor.
James N. Skinner
by Theo. G. Ellis, attorney

UNITED STATES PATENT OFFICE.

JAMES N. SKINNER, OF NEW BRITAIN, CONNECTICUT.

LATHE-CHUCK.

SPECIFICATION forming part of Letters Patent No. 250,400, dated December 6, 1881.

Application filed July 2, 1881. (No model.)

*To all whom it may concern:*

Be it known that I, JAMES N. SKINNER, of of New Britain, in the county of Hartford and State of Connecticut, have invented certain new and useful Improvements in Lathe-Chucks; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvements relate to chucks which are adapted to be attached to the spindle of a turning-lathe for the purpose of holding and centering objects to be turned, particularly to such chucks as are interchangeable from an independent jaw-chuck to a universal chuck.

The object of my invention is to provide a simpler and better construction for the mechanism by which the chuck is changed from independent to universal, to provide a reversible jaw which is capable of taking and holding in the gripe of the chuck a greater range of sizes of objects for the same size or diameter of chuck than has heretofore been done, and to provide a construction of slide for the jaw which obviates the customary defect of working loose in the bearings.

Figure 1:
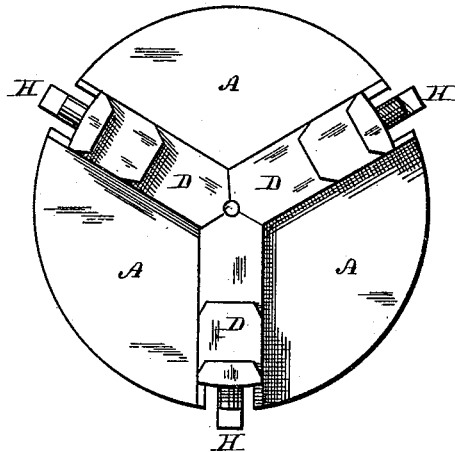
Figure 2:
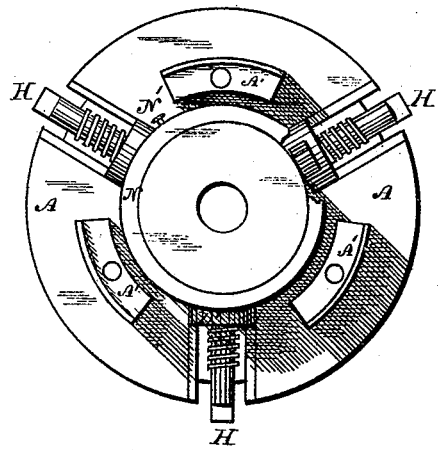
Figure 3:
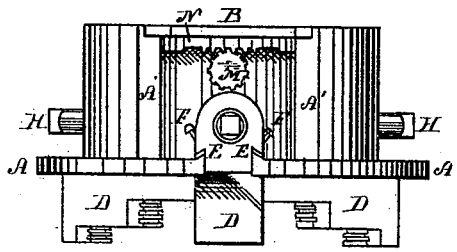
Figure 4:
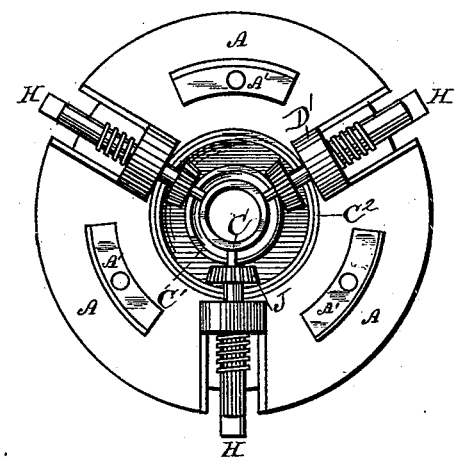
Figure 5:
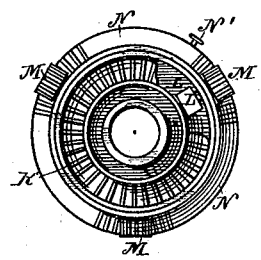
Figure 6:
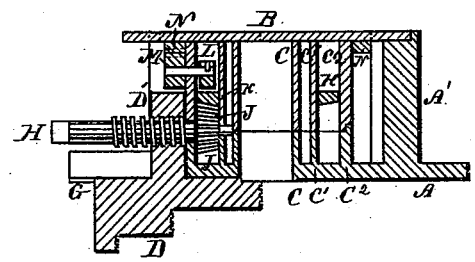
Figure 7:
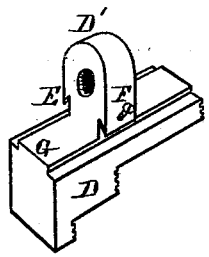

In the accompanying drawings, on two sheets, illustrating my invention, Figure 1 is a front or face view of the chuck with the jaws closed. Fig. 2 is a rear view of the chuck with the back plate removed. Fig. 3 is an edge view of the chuck in the position shown in Fig. 1. Fig. 4 is a rear view of the chuck with the rack and parts for moving the jaws simultaneously removed, so as to show the screws which operate the jaws. Fig. 5 is a view of the under side of the parts removed from Fig. 4. Fig. 6 is a cross-section through the chuck cutting one of the jaws. Fig. 7 is a perspective view of one of the jaws detached.

A is the circular face of the chuck. It has three standards, A', forming part of it and extending to the rear, to which the back plate, B, is bolted. These parts form the fixed frame for containing the working parts.

C C' C² are annular divisions within the body, extending from front to rear for inclosing the working parts, which they completely cover and protect from all entrance of chips, dust, &c.

D D D are the jaws. They are made to slide in grooves in the face A, so as to move radially out and in. The outer part of the jaw is made in steps to take objects of different sizes in the usual manner. The back of the jaw has a projection, D', passing through the plate A, which forms the nut for the screw, by which the jaw is operated. The interior end of this projection is wider than the slot in the plate A, and rests against dovetailed guides upon the inside of A, as shown in Fig. 3. Upon these dovetailed guides are shoes E, which are pressed against A by the set-screws F. These are for the purpose of adjusting and tightening the bearing whenever it becomes loose from wear. The jaw D is furnished with a lip or projection, G, which enters the slot in A, and extends the whole length of the jaw. This is for the purpose of giving a long lateral bearing to the jaw, so that it cannot turn laterally. The jaws D are made reversible, and can be unscrewed and slipped off the end of the screws by which they are actuated, and out of the plate A; and in order to get the full play in either position the rear projections, D', are placed in the middle of the length of the jaw.

H H H are the screws by which the jaws are held and operated. They pass through the nuts in projections D', and have bearings in the annular partitions C, &c.

J J J are small bevel-gears forming part of the spindles of the screws H. They rest between the partitions C' and C², while the inner end of the spindle passes through to the partition C, thus giving a firm and durable bearing to prevent end movement of the screw.

K is a beveled rack fitting between the partitions C' and C², directly over the wheels J. When the rack is pressed against these pinions it gears into all of them, and the turning of one turns them all. When the rack is released the pinions and the screws attached to them can be turned independently. The movement of this rack K to or from the pinions makes the chuck either universal or independent.

L L L are three eccentric cams for operating the rack K. They are connected with three pinions, M M M, by means of arbors passing through the partition $C^2$, and these pinions M are operated by the circular rack N turning upon the partition $C^2$, resting in the teeth of the pinions, and held in place by the plate B. The rack N is furnished with teeth only where it comes in contact with the pinions, as shown in Fig. 3. At each side of the teeth there is a recess cut into the rack, which, when the pinions come opposite, allows the pinion to turn freely. When the rack is in this position either of the pinions can be turned by hand, so as to press only that part of the rack K against its corresponding pinion J, so that by this device either of the screws H can be released and moved separately, if desired. Ordinarily, however, the rack N is employed to move all of the cams L together, and thus make the chuck either universal or independent, as may be wished for use. The rack N is furnished with one or more knobs or handles, N', for turning it readily. When turned so that the cams press the rack K against the pinions J a key can be applied to either one of the screws H, the heads of which are squared for the purpose, and all the screws then operate together. When the rack N is turned the opposite way the cams release the rack K, and either screw can be turned by a key or wrench independently.

It will be observed that in my improved chuck all the operating parts are placed in the center, so as to leave the circumference of the frame clear. By this means I am enabled to make the jaws reversible and readily removable from the frame or case, which is impossible with the ordinary construction, where the racks, cams, and pinions are upon the circumference of the chuck.

It will also be observed that by making the nut which carries the jaw near the middle of its length, and making the jaw reversible, a much greater range, both in inside and outside work, is obtained, and that this construction cannot be adapted to chucks having the working parts upon the circumference, but can be readily obtained with my improved interior arrangement of connections.

What I claim as my invention is—

1. In a lathe-chuck, the combination of the rack K, the eccentric cams L, the pinions M, and the rack N, as a device for operating the pinions J and connecting or disconnecting the screws H, substantially as described.

2. In a lathe-chuck, the inclosed central box formed by the front and back plates, A and B, and the sides, C' and $C^2$, for containing the working parts, in combination with the operating mechanism of said chuck, substantially as described.

3. In a lathe-chuck, the combination of the rack N, provided with alternating teeth and recesses, the pinions M, and cams L, for operating the rack K, whereby any one of the screws H can be released and moved separately, substantially as described.

JAMES N. SKINNER.

Witnesses:
J. L. CASE,
M. D. SKINNER.